United States Patent [19]

Liu et al.

[11] Patent Number: 5,577,698
[45] Date of Patent: Nov. 26, 1996

[54] LOCKING STRAP FASTENER FOR SUSPENDING FESTIVE ADORNMENTS

[75] Inventors: Ivan Liu, Ontario, Canada; Charles W. Fennessy, Lemont; Frank Lang, Warrenville, both of Ill.

[73] Assignee: Noma International Inc., Forest Park, Ill.

[21] Appl. No.: 382,966

[22] Filed: Feb. 2, 1995

[51] Int. Cl.⁶ ............................................. F16L 03/08
[52] U.S. Cl. .................... 248/214; 24/16 PB; 24/17 AP; 24/30.5 P; 248/215; 248/316.7
[58] Field of Search ................................ 248/316.7, 214, 248/215; 24/17 AP, 16 PB, 30.5 P

[56] References Cited

U.S. PATENT DOCUMENTS

| 3,568,262 | 3/1971 | Woldman | 24/16 PB |
|---|---|---|---|
| 3,908,233 | 9/1975 | Caveney et al. | 24/16 PB |
| 3,991,444 | 11/1976 | Bailey | 24/16 PB |
| 4,128,220 | 12/1978 | McNeel | 248/60 |
| 4,817,901 | 4/1989 | Kuo | 248/232 |
| 4,901,403 | 2/1990 | Larsen | 24/16 PB |
| 4,958,414 | 9/1990 | Benoit | 24/16 PB |
| 5,193,250 | 3/1993 | Caveney | 24/16 PB |
| 5,398,383 | 3/1995 | Bingold | 24/16 PB |

FOREIGN PATENT DOCUMENTS

| 2360992 | 12/1973 | Germany | 24/16 PB |
|---|---|---|---|
| 63-49353 | 4/1986 | Japan . | |
| 2081360 | 2/1982 | United Kingdom . | |
| W086/02709 | 5/1986 | WIPO . | |

Primary Examiner—Ramon O. Ramirez
Assistant Examiner—Michael J. Turgeon
Attorney, Agent, or Firm—Kirschstein, et al.

[57] ABSTRACT

An arrangement for mounting decorative items on cylindrical supports available at the premises to be decorated includes an elongated strap that is flexible for winding around the respective cylindrical support, and a fixture secured to one end of the strap and carrying a hook-shaped formation for suspending the decorative item therefrom. The strap has a series of ratchet-type teeth on one of its major surfaces, and the fixture has an aperture for the passage of the strap therethrough after having been wound around the cylindrical support. The fixture also includes a pawl-type holding member mounted thereon for pivoting between an engaging position in which it engages at the aperture behind one of the teeth of the strap, and a releasing position in which it frees the strap for unimpeded passage through the aperture.

8 Claims, 2 Drawing Sheets

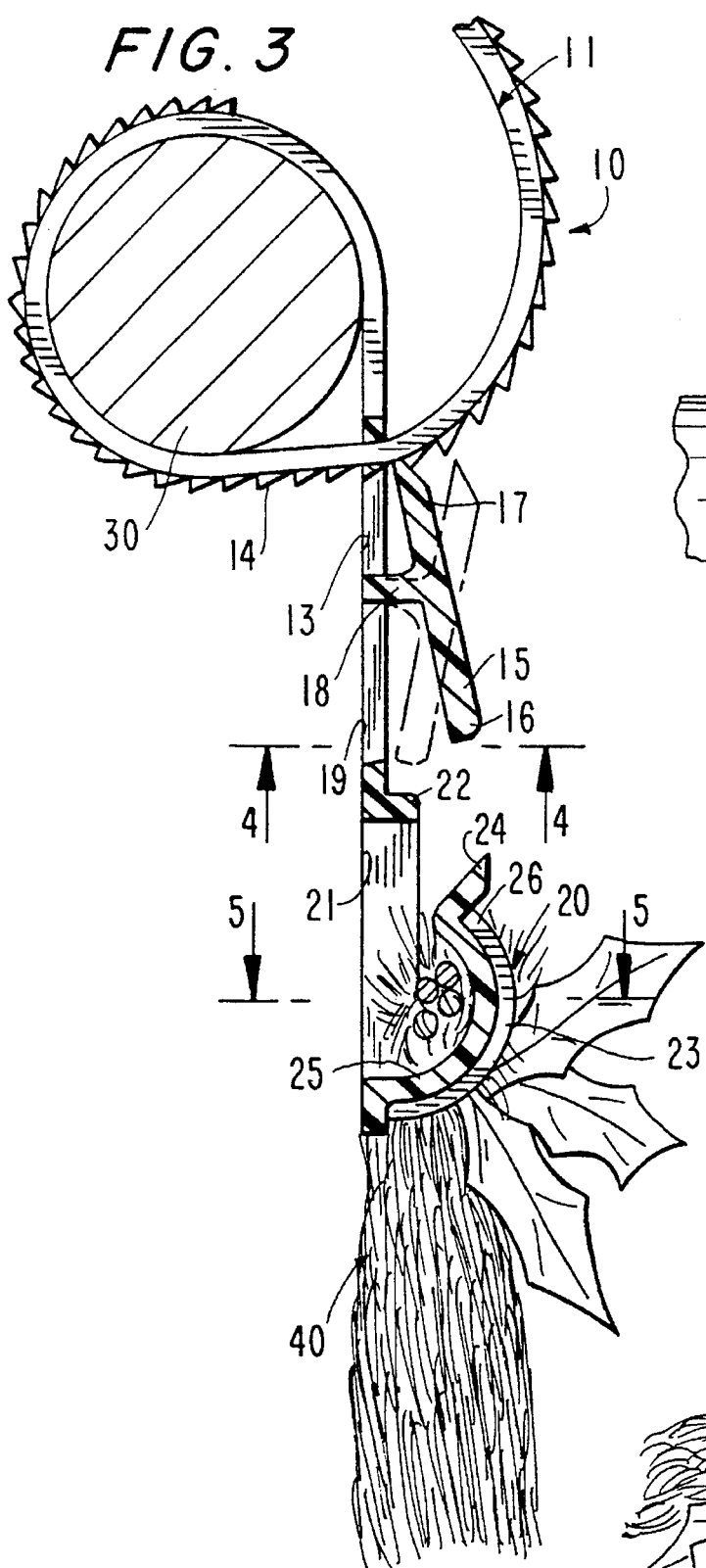
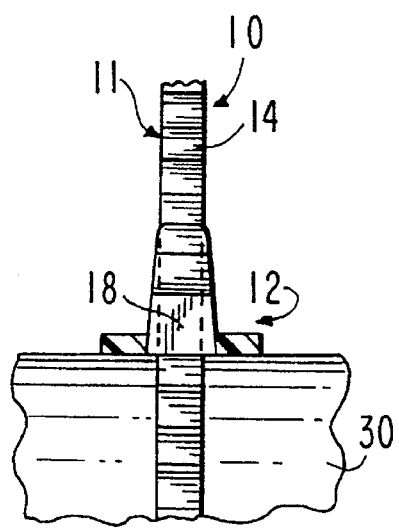
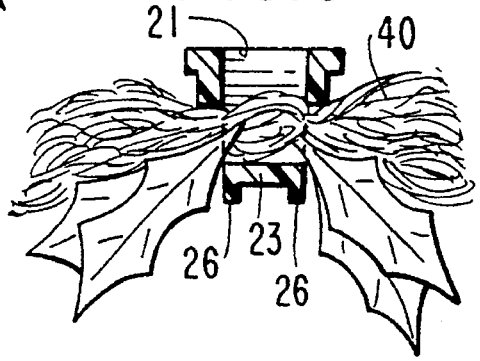

5,577,698

LOCKING STRAP FASTENER FOR SUSPENDING FESTIVE ADORNMENTS

BACKGROUND OF THE INVENTION

1. Field of the Invention

The present invention relates to mounting arrangements in general, and more particularly to arrangements for suspending festive adornments from supports available on the premises to be decorated.

2. Description of the Related Art

There are already known various arrangements for mounting diverse objects on one another or connecting such objects to each other, among them such that are constructed or configured as locking strap fasteners. Examples of fastening arrangements of the latter type can be found, for instance, in U.S. Pat. Nos. 548,297; 3,568,262; 4,128,220 and 5,293,669.

As disclosed in each of these patents, the locking strap fastener includes a locking strap proper and a fixture that is affixed to one end portion of the locking strap. This fixture in each instance has an aperture for the passage of the other end portion of the strap therethrough, and means for releasably engaging such other end portion for locking the same in position relative to the fixture for as long as desired. The primary function of the strap is to keep together a plurality of objects and/or hold them in place by passing through holes provided in such objects (such as in shoelace eyelets in the arrangement of the U.S. Patent No. 5,293,669) or by being wrapped and/or tightened around the objects (such as around a bundle of electrical wires, an electrical cable or the like as in the arrangements of the other three patents). When it is desired to use the locking strap fasteners to suspend the affected objects from a support, each of the fixtures is provided with integral mounting means (such as tings, hooks or the like) configured to engage the support with the desired degree of security of attachment.

While it may well be that the above arrangements satisfy the requirements for which they have been designed, they are not suited for use in applications different from those disclosed in the above patents. More particularly, if it were attempted to employ fastening arrangements identical or similar to those disclosed in the above patents in accordance with the principles disclosed there for suspending wreaths, garlands or similar Christmas or other holiday decorations from railings, banister handrails or similar support structures that can be found on the premises to be decorated, it would be discovered that they either cannot be mounted on such structures to begin with, or would inflict damage on such structures if used.

OBJECTS OF THE INVENTION

Accordingly, it is a general object of the present invention to avoid the disadvantages of the prior art.

More particularly, it is an object of the present invention to provide a locking strap mounting arrangement that does not possess the drawbacks of the known arrangements of this type.

Still another object of the present invention is to devise a locking strap mounting arrangement of the type here under consideration that is especially suited for hanging wreaths and similar holiday decorations on banister handrails or similar support structures.

It is yet another object of the present invention to design the above arrangement in such a manner as to be able to hold the decorative object at any selected location along the support structure without moving along such structure.

A concomitant object of the present invention is so to construct the arrangement of the above type as to be relatively simple in construction, inexpensive to manufacture, easy to use, and yet reliable in operation.

SUMMARY OF THE INVENTION

In keeping with the above objects and others which will become apparent hereafter, one feature of the present invention resides in an arrangement for mounting decorative items on cylindrical supports available at the premises to be decorated. This mounting arrangement includes a mounting member that consists of an elongated strap and a fixture integral with the strap. The strap is flexible for winding around the respective cylindrical support and has a series of ratchet-type teeth on one of its major surfaces.

The fixture is constructed for suspending the respective decorative item therefrom. It has an aperture for the passage of the strap therethrough after having been wound around the cylindrical support, and includes a pawl-type holding member mounted thereon for pivoting between an engaging position in which it engages at the aperture behind one of the teeth of the strap, and a releasing position in which it frees the strap for unimpeded passage through the aperture. The holding member advantageously includes an engaging portion that is movable into and out of engagement with the respective teeth of the strap as the holding member pivots between its engaging and releasing positions, and an actuating portion remote from the engaging portion and operative for being engaged by a user of the arrangement and actuated to move the holding member toward the releasing position thereof.

The arrangement of the present invention finds its best use in an application in which the cylindrical support is a banister handrail and the decorative item is a wreath. Under these circumstances, it is particularly advantageous when the fixture is equipped with a hook-shaped formation for suspending the decorative item, such as a wreath, therefrom.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 3 is a partly sectioned view, taken on line 3—3 of FIG. 2, of a fragment of the inventive mounting arrangement, on a scale that exceeds those used in both FIG. 1 and FIG. 2;

FIG. 4 is a cross-sectional view taken on line 4—4 of FIG. 3; and

FIG. 5 is another cross-sectional view, this time taken on line 5—5 of FIG. 3.

DETAILED DESCRIPTION OF THE PREFERRED EMBODIMENT

Figures 1, 2:
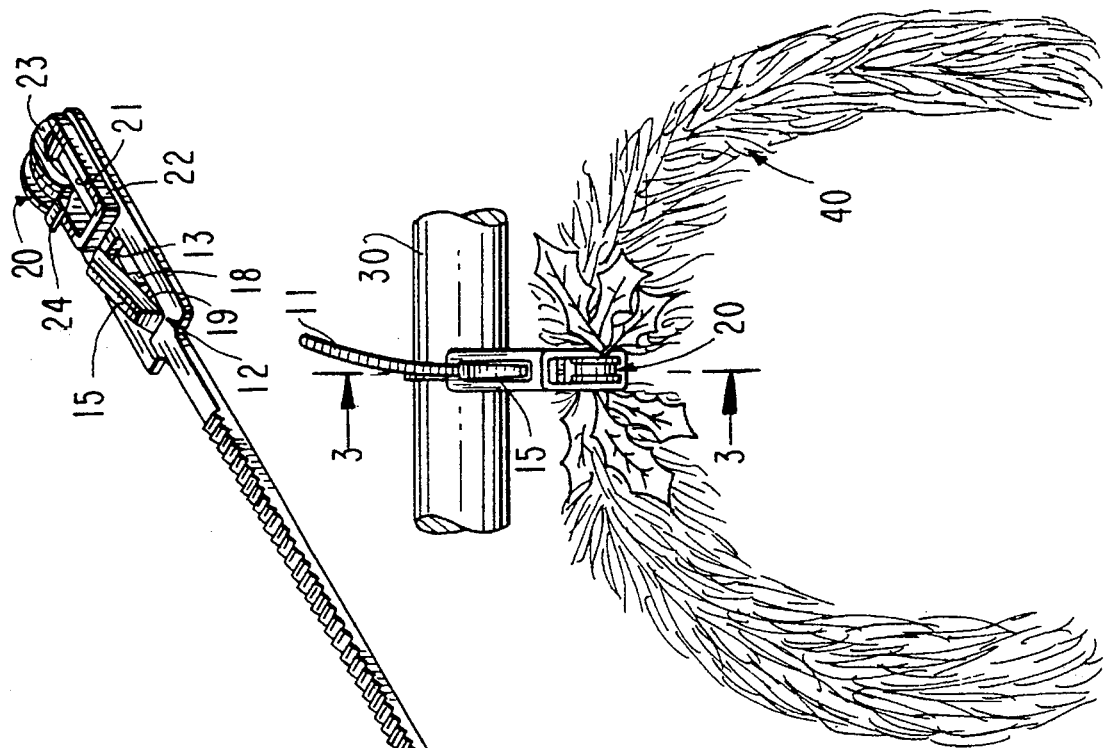
FIG. 1 is a perspective view of a locking strap mounting arrangement of the present invention in a condition assumed prior to its use.
FIG. 2 is a side elevational view of the locking strap mounting arrangement of FIG. 1 as used for suspending a wreath from a railing, on a scale that is reduced relative to that of FIG. 1.

Referring now to the drawing in detail, and first to FIG. 1 thereof, it may be seen that the reference numeral 10 has been used therein to identify a locking strap mounting arrangement of the present invention in its entirety. The locking strap mounting arrangement 10 includes a locking strap 11 proper, and a fixture 12 secured to (as shown, integral with) one end of the locking strap 11.

The fixture 12 has an opening or aperture 13 therein for the passage therethrough of an end portion of the locking strap 11 that is remote from the fixture 12 and has as much of an effective length as needed or required for the locking strap 11 to embrace a banister rail 30 with the desired degree of tightness. In many instances, the locking strap 11 is to be tightened to such an extent as to prevent any movement of the mounting arrangement 10 relative to the rail 30, and especially that in the longitudinal direction of the rail 30. This is particularly useful when the railing 30 on which the mounting arrangement 10 is to be mounted extends in a direction other than horizontal, such as is the case with a staircase banister handrail, in that it prevents the mounting arrangement 10 from slipping along the handrail 30.

To maintain the desired degree of tightness for as long as needed, the locking strap 11 is shown to be provided with a series of ratchet-type teeth 14 distributed substantially equidistantly along its length as depicted, or at least along the expected maximum effective length of the aforementioned remote end portion of the strap 11, and the fixture 12 carries an integral pawl-type protuberance or locking member 15 that extends in such a direction relative to the remainder of the fixture 12 and particularly the aperture 13 thereof as to engage in the spaces between the teeth 14 when the mounting arrangement 10 is wrapped around the handrail 30 in the manner indicated in FIG. 2 of the drawing.

Additional details of the construction of the locking member 15 and its relation with respect to and cooperation with the remainder of the fixture 12 and the strap 11 can be discerned from consideration of FIGS. 3 and 4 of the drawing in conjunction with one another. It may be seen there that the locking member 15 is elongated and includes an actuating end portion 16 and an engaging end portion 17, the latter being tapered so as to generally conform to the shape of the spaces between the teeth 14 of the strap 11. The locking member 15 is mounted, at a region thereof at which the end portions 16 and 17 merge with one another, on a support portion 18 that is constituted by a transversely extending integral portion of the fixture 12 that separates the aperture 13 from another through aperture or opening 19. Each of the apertures 13 and 19 is juxtaposed with a different one of the end portions 16 and 17 of the locking member 15.

As shown, the locking member 15 is actually integral (of one piece) with the support portion 18 of the fixture 12. The locking member 15 is movable, in a two-armed lever fashion, between its locking position shown in solid lines, and its releasing position indicated in dash-dotted lines in FIG. 3. To enable such movement of the locking member 15 relative to the support portion 18 and for other reasons that will be discussed later, the locking strap arrangement 11 is made of a material that is not only flexible but also elastically deformable. Yet, the elastic deformability of such material must not be excessive lest the deformation of the engaging end portion 17 and/or the respective tooth 14 with which the engaging end portion 17 engages in its operative or locking condition result in discontinuance of such locking engagement. Polyethylene, the material commercially available under the trademark Nylon, polyvinyl chloride and other similar synthetic plastic materials are ideal candidates for this purpose.

As alluded to before, the engaging end portion 17 of the locking member 15 is to engage behind one of the teeth 14 of the strap 11. To assure safe locking, the teeth 14 are configured as generally triangular serrations delimited by two flanks, of which that one which is to be engaged by the engaging end portion 17 of the locking member 15 extending substantially perpendicularly to the strap 11, while the other has a more gentle slope to act as a ramp. This configuration renders it possible for the engaging end portion 17 to move past the consecutive teeth 14 as the strap 11 is being tightened around the handrail 30 by being deflected out of the way by the ramp-shaped flank, and yet to securely detain the respective tooth 14 in position relative to the fixture 12 by engaging behind the perpendicularly extending flank of that tooth 14 once the tightening action is terminated.

Even though this is not clearly visible in FIG. 3, the locking member 15, inclusive of the supporting portion 18 thereof, is so constructed and dimensioned relative to the remainder of the fixture 12 that in the locking position shown in solid lines in FIG. 3 of the drawing the tapered tip of the engaging end portion 17 of the locking member 15 is spaced from the fixture 12 by less than the minimum thickness of the strap 11 (that is, the distance between the bottom of the space between two consecutive teeth 14 and the surface facing in the opposite direction than the teeth 14). This avoids the possibility that the tightened strap 11 could pull the engaging end portion 17 into and through the aperture 13 with attendant loss of the locking action.

As indicated before, there is no need to act on the actuating end portion 16 of the locking member 15 while the strap 11 is being pulled through the aperture 13 of the fixture 12 during the strap tightening operation. On the other hand, it is mandatory to operate the actuating end portion 16 when it is desired to move the strap 11 through the aperture 13 in the opposite direction, especially when the mounting arrangement 10 is to be removed from the handrail 30, for instance after the holiday season is over, in such a manner as to move the locking member 15 toward or into its dash-dotted line releasing position. It is evident that in this latter position the pointed tip of the engaging end portion 17 of the locking member 15 is sufficiently spaced from the strap 11 and from even the crests of the teeth 14 thereof to let it be pulled out through the aperture 13 without interfering with such movement. This is where the advantage of the provision of the aperture 19 that is juxtaposed with the actuating end portion 16 comes in: such other aperture 19 permits the actuating end portion 16, and thus the entire locking member 15, to be tilted about the fulcrum located at the juncture of the locking member 15 with the support portion 18 to an extent exceeding that which would be available if the actuating end portion 16, in the absence of the aperture 19, were to come into contact with the fixture 12 after being depressed.

As a comparison of FIGS. 1, 3 and 5 of the drawing will reveal, the fixture 12 of the mounting arrangement 10 further includes a holding device or hook 20 that is situated below the aperture 19 as considered in the position of use of the arrangement 10 that is presented in FIG. 3. The holding device 20 includes a through opening 21 of a generally rectangular contour that is surrounded and partially bounded by a reinforcing rib 22, and a generally hook-shaped holding portion 23 that extends from below the opening 21 upwardly to about two-thirds of the opening 21, at a forward spacing therefrom, again as considered in the operative position of the mounting arrangement 10 as shown in FIG. 3. The holding portion 23 is provided, at its upper end as considered in the operative position, with a manipulating nose portion 24 that can be engaged by the user of the mounting arrangement 10 and acted upon to deflect the holding portion 23 away from the reinforcing rib 22, thereby to increase the clearance between the two to permit the user to introduce or withdraw a portion of a holiday decoration 40, shown to be constituted by a wreath, from a recess 25 formed in the holding portion 23 due to its arcuate configuration. In the absence of such deflection, the holding portion 23 confines and/or grips the aforementioned portion of the decoration 40 between itself and the reinforcing rib 22, thus preventing accidental or unintended dislodgement of the decoration 40 and/or any other movement of the decoration 40 relative to the fixture 12. It may also be observed in FIG. 5 of the drawing that the holding portion 23 is provided with a pair of reinforcing ribs, both identified with the same reference numeral 26, extending over substantially the entire length of the arcuate holding portion 23 on an external surface of the latter.

It has already been mentioned that the mounting arrangement 10 is made of an elastically deformable material to permit the tilting of the locking member 15 relative to its support portion 18. However, this is not the only reason for using such relatively soft material. Another one is to permit the deflection of the holding member 23, the resistance of which to such deflection is increased by the presence of the integral ribs 26 thereon, away from the rib 22 and its faultless resilient return after the deflecting nose 24 has been released. Last but not least, the use of such material not only permits the locking strap 11 to be easily wound around the railing or other similar support 30, but also avoids damage to the railing 30 due to the inherently softer nature of such material that causes the strap 11 or the fixture 12 to yield on contact with the rail 30, rather than to dig into the same.

It will be understood that each of the elements described above, or two or more together, may also find a useful application in other types of constructions differing from the type described above.

While the present invention has been described and illustrated herein as embodied in a specific construction of a holiday decoration mounting arrangement, it is not limited to the details of this particular construction, since various modifications and structural changes may be made without departing from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An arrangement for mounting decorative items on supports available at the premises to be decorated, comprising:

a mounting member including an elongated strap that is flexible for winding around the respective support and has a series of ratchet-type teeth on one of its major surfaces, and a fixture secured to one end of said strap and including a hook-shaped formation for suspending the respective decorative item therefrom and an opening bounded by a reinforcing rib and underlying said hook-shaped formation, said fixture having an aperture for the passage of said strap therethrough after having been wound around the support, and including a pawl-type holding member mounted thereon for pivoting between an engaging position in which the holding member engages at said aperture behind one of said teeth of said strap, and a releasing position in which the holding member frees said strap for unimpeded passage through said aperture.

2. The arrangement as defined in claim 1, wherein said holding member includes an engaging portion that is movable into and out of engagement with the respective teeth of said strap as said holding member pivots between said engaging and releasing positions thereof, and an actuating portion remote from said engaging portion and operative for being engaged by a user of the arrangement and actuated to move said holding member toward said releasing position thereof.

3. The arrangement as defined in claim 2, wherein said fixture has an additional aperture, and wherein said engaging portion enters said additional aperture in said releasing position.

4. The arrangement as defined in claim 1, for use with a support configured as a cylindrical banister handrail.

5. The arrangement as defined in claim 1, for use with a decorative item configured as a wreath.

6. The arrangement as defined in claim 1, wherein said hook-shaped formation has a plurality of arcuate reinforcing ribs spaced transversely apart.

7. The arrangement as defined in claim 1, wherein said hook-shaped formation has a manipulating portion.

8. The arrangement as defined in claim 1, wherein said fixture and said strap are integrally molded of a synthetic plastic material.

\* \* \* \* \*